US010176168B2

(12) United States Patent
Gao et al.

(10) Patent No.: US 10,176,168 B2
(45) Date of Patent: Jan. 8, 2019

(54) STATISTICAL MACHINE TRANSLATION BASED SEARCH QUERY SPELLING CORRECTION

(75) Inventors: Jianfeng Gao, Woodinville, WA (US); Mei-Yuh Hwang, Bellevue, WA (US); Xuedong D. Huang, Bellevue, WA (US); Christopher Brian Quirk, Seattle, WA (US); Zhenghao Wang, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 655 days.

(21) Appl. No.: 13/296,640

(22) Filed: Nov. 15, 2011

(65) Prior Publication Data

US 2013/0124492 A1 May 16, 2013

(51) Int. Cl.
*G06F 17/30* (2006.01)
*G06F 17/28* (2006.01)
*G06F 17/27* (2006.01)

(52) U.S. Cl.
CPC ........ *G06F 17/2818* (2013.01); *G06F 17/273* (2013.01); *G06F 17/30864* (2013.01)

(58) Field of Classification Search
CPC .......... G06F 17/30864; G06F 17/3087; G06F 17/3064; G06F 17/30657; G06F 12/121
USPC ......................................... 707/706, 748, 759
See application file for complete search history.

(56) References Cited

U.S. PATENT DOCUMENTS 7,440,941 B1 * 10/2008 Borkovsky .......... G06F 17/3064
7,672,927 B1 * 3/2010 Borkovsky ....... G06F 17/30672
707/999.003
7,716,229 B1 5/2010 Srivastava et al.
2002/0152204 A1 * 10/2002 Ortega et al. ..................... 707/3
2004/0002994 A1 1/2004 Brill et al.
2005/0210017 A1 9/2005 Cucerzan
2005/0251744 A1 * 11/2005 Brill ...................... G06F 17/273
715/257
2007/0038615 A1 2/2007 Vadon et al.
(Continued)

OTHER PUBLICATIONS

"An Evaluation to detect and Correct Erroneous Characters Wrongly Substituted, Deleted and Insterted in Japanese and English Sentences Using Markov Models" Tetsuo Araki, Satoru Ikehara, Nobuyuki Tsukahara, Yasunori Komatsu (1994).*

(Continued)

*Primary Examiner* — Syling Yen
(74) *Attorney, Agent, or Firm* — Alleman Hall Creasman & Tuttle LLP

(57) ABSTRACT

Statistical Machine Translation (SMT) based search query spelling correction techniques are described herein. In one or more implementations, search data regarding searches performed by clients may be logged. The logged data includes query correction pairs that may be used to ascertain error patterns indicating how misspelled substrings may be translated to corrected substrings. The error patterns may be used to determine suggestions for an input query and to develop query correction models used to translate the input query to a corrected query. In one or more implementations, probabilistic features from multiple query correction models are combined to score different correction candidates. One or more top scoring correction candidates may then be exposed as suggestions for selection by a user and/or provided to a search engine to conduct a corresponding search using the corrected query version(s).

20 Claims, 7 Drawing Sheets

(56) References Cited

U.S. PATENT DOCUMENTS

| | | | | |
|---|---|---|---|---|
| 2008/0147637 | A1* | 6/2008 | Li | G06F 17/30672 |
| 2008/0319738 | A1* | 12/2008 | Liu | G06F 17/277 |
| | | | | 704/10 |
| 2009/0083255 | A1* | 3/2009 | Li | G06F 17/273 |
| 2010/0180199 | A1* | 7/2010 | Wu | G06F 17/278 |
| | | | | 715/259 |
| 2013/0346434 | A1* | 12/2013 | Shazeer | G06F 17/273 |
| | | | | 707/759 |

OTHER PUBLICATIONS

"Exploring Distrbutional Similarity Based Models for Query Spelling Correction" Mu Li, Muhua Zhu, Yang Zhang & Ming Zhou (2006).*

"Learning in Natural Language" Dan Roth (1999).*

"Pronunciation Modeling for Improved Spelling Correction" Kristina Toutanova & Robert C. Moore (2002).*

Noeman, Sara., "Transliteration using phrase based SMT approach an substrings", Retrieved at <<http://www.elda.org/medar-conference/pdf/23.pdf>>, 2nd International Conference on Arabic Language Resources Tools 2223, Apr. 2009, pp. 199-204.

Zhao, et al., "A Log-linear Block Transliteration Model based on Bi-Stream HMMs", Retrieved at <<http://acl.idc.upenn.edu/N/N07/N07-1046.pdf>>, NAACL Human Language Technology Conference, HLT-NAACL, Jan. 2007, pp. 364-371.

Sun, et al., "Learning Phrase-Based Spelling Error Models from Clickthrough Data", Retrieved at <<http://research.microsoft.com/en-us/um/people/jfgao/paper/116_camera-ready.pdf>>, Proceedings of the 48th Annual Meeting of the Association for Computational Linguistics, 2010, pp. 9.

* cited by examiner

STATISTICAL MACHINE TRANSLATION BASED SEARCH QUERY SPELLING CORRECTION

BACKGROUND

A browser or other application providing web-based searches may be configured to receive an input search query, conduct a search, and return a list of search results corresponding to the query. In some cases, a search query input by a user may include some misspelled search terms. Results obtained using misspelled queries may be incomplete and generally are not what the user expects, which may be dissatisfying to the user. Accordingly, some search providers may attempt to correct misspelling in queries and provide suggestions and/or results based on a corrected query.

However, traditional techniques employed to correct queries involve applying a predefined dictionary of "correct" terms. Due to the dynamic nature of the web, though, dictionary based techniques may be inadequate because new phrases and terms appear frequently in the search context and searches often include names, abbreviations, and informal terms that may be hard to capture with a dictionary based approach. Thus, it may be difficult to derive accurate query corrections with traditional dictionary based techniques.

SUMMARY

Statistical Machine Translation (SMT) based search query spelling correction techniques are described herein. In one or more implementations, search data regarding searches performed by clients may be logged. The logged data includes query correction pairs that may be used to ascertain error patterns indicating how misspelled substrings may be translated to corrected substrings. The error patterns may be used to determine suggestions for an input query and to develop query correction models used to translate the input query to a correctly spelled query. In one or more implementations, probabilistic features from multiple query correction models are combined to score different correction candidates. One or more top scoring correction candidates may then be exposed as suggestions for selection by a user and/or provided to a search engine to conduct a corresponding search using the corrected query version(s).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Traditional techniques employed to correct search queries involve applying a predefined dictionary of "correct" terms. However, dictionary based techniques are often inadequate for web searches because users continually search for new phrases and searches include informal terms, names, abbreviations, and other terms that are hard to capture with a dictionary based approach.

Statistical Machine Translation (SMT) based search query spelling correction techniques are described herein. In one or more implementations, search data regarding searches performed by clients may be logged. The logged data includes query correction pairs that may be used to ascertain error patterns indicating how misspelled substrings may be transformed to corrected substrings. The error patterns may be used to determine suggestions for an input query and to develop query correction models used to translate the input query to a corrected query.

In one or more implementations, probabilistic features from multiple query correction models are combined to score different correction candidates. For example, selected features at least some of which are derived from the multiple query correction models may be combined in a log-linear model to rank possible correction candidates. In one embodiment, the query correction models include a translation model, a word-based language model, and a character-based language model that may each contribute to one or more scores used to rank different correction candidates. One or more top scoring correction candidates determined by comparison of the scores one to another (e.g., ranking the scores) may then be exposed as suggestions for selection by a user and/or provided to a search engine to conduct a corresponding search using the corrected query version(s). Accordingly, SMT based search query spelling correction techniques may be employed to generate spelling corrections for input search queries in lieu of dictionary based techniques and/or to supplement dictionary based techniques.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
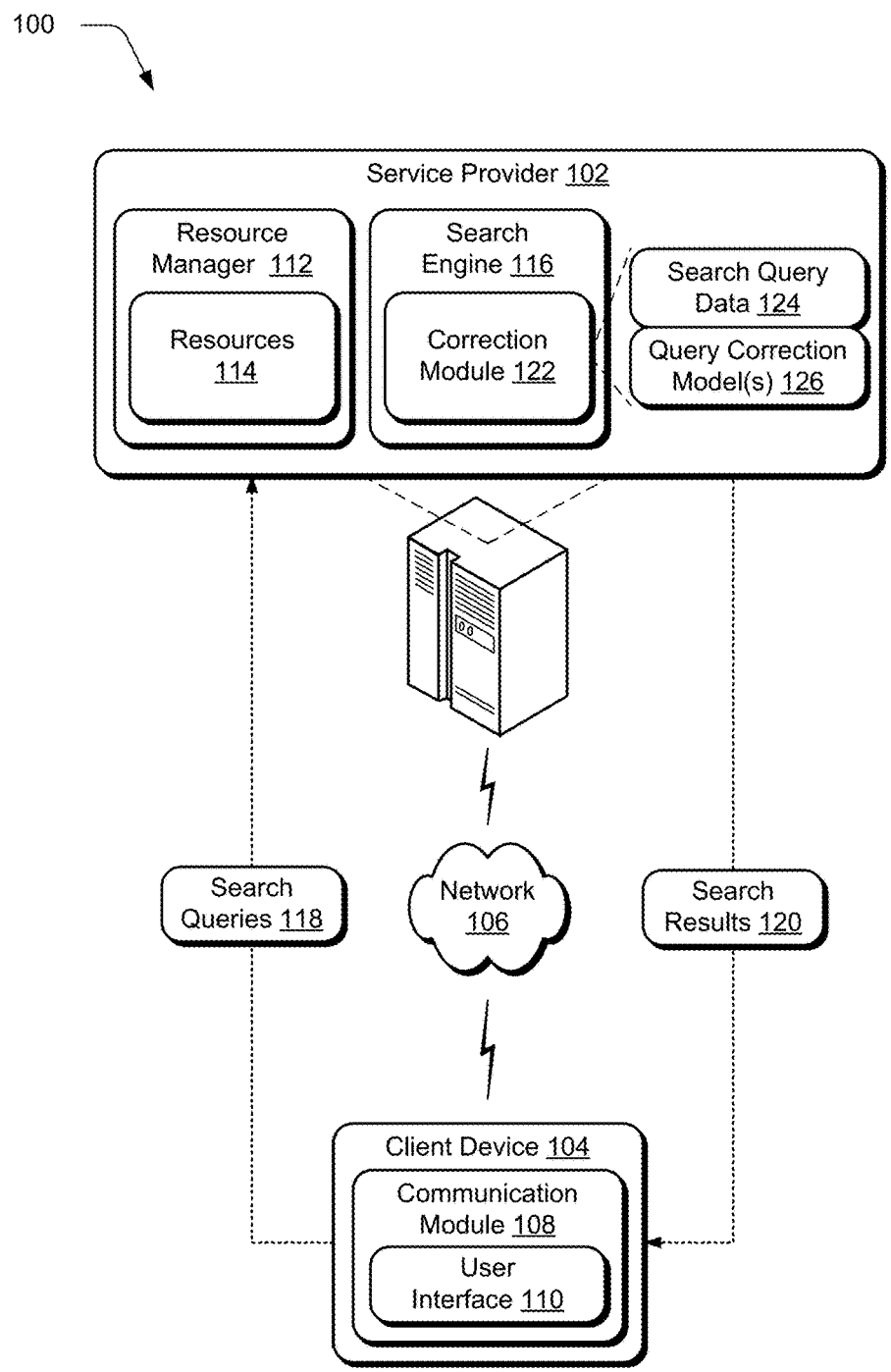
FIG. 1 is an illustration of an environment in an example implementation that is operable to employ SMT based search query spelling correction techniques.

FIG. 1 is an illustration of an environment 100 in an example implementation that is operable to employ techniques described herein. The illustrated environment 100 includes a service provider 102 that is communicatively coupled to a client device 104 via a network 106. The service provider 102 and the client device 104 may be implemented using a wide variety of computing devices.

For example, a computing device may be configured as a computer that is capable of communicating over the network 106, such as a desktop computer, a mobile station, an entertainment appliance, a set-top box communicatively coupled to a display device, a wireless phone, a game console, a server, and so forth. Thus, the computing device may range from full resource devices with substantial memory and processor resources (e.g., servers, personal computers, game consoles) to a low-resource device with limited memory and/or processing resources (e.g., traditional set-top boxes, hand-held game consoles). Additionally, although a single computing device is shown (e.g., a server for the service provider 102), the computing device may be representative of a plurality of different devices, such as multiple servers utilized by a business to perform operations (e.g., a server farm), a remote control and set-top box combination, an image capture device and a game console configured to capture gestures, and so on.

A computing device may also include an entity (e.g., software) that causes hardware of the computing device to perform operations, e.g., processors, functional blocks, and so on. For example, the computing device may include a computer-readable medium that may be configured to maintain instructions that cause the computing device, and more particularly hardware of the computing device to perform operations. Thus, the instructions function to configure the hardware to perform the operations and in this way result in transformation of the hardware to perform functions. The instructions may be provided by the computer-readable medium to the computing device through a variety of different configurations.

One such configuration of a computer-readable medium is signal bearing medium and thus is configured to transmit the instructions (e.g., as a carrier wave) to the hardware of the computing device, such as via the network 106. The computer-readable medium may also be configured as a computer-readable storage medium that excludes signals per se. Examples of a computer-readable storage medium include a random-access memory (RAM), read-only memory (ROM), an optical disc, flash memory, hard disk memory, and other memory devices that may use magnetic, optical, and other techniques to store instructions and other data.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks.

The client device 104 is further illustrated as including a communication module 108. The communication module 108 is representative of functionality of the client device 104 to communicate via the network 106, such as with the service provider 102. For example, the communication module 108 may incorporate browser functionality to navigate the network 106, may be configured as a dedicated application having network access functionality, and so on. As illustrated, the communication module 108 may provide a user interface 110 to provide various interactions with the client device 104, services and/or content available over the network from various providers, and/or other communication/browser functionality.

The service provider 102 is illustrated as including a resource manager 112, which is representative of functionality to provide and manage access to one or more resources 114 via the network 106. Generally speaking, the resource manager 112 represents functionality operable by the service provider 102 to manage various resources 114 that may be made available over a network. The resource manager 112 may manage access to the resources 114, performance of the resources 114, configuration of user interfaces 110 or data to provide the resources 114, and so on.

Resources 114 can include any suitable combination of content and/or services typically made available over a network by one or more service providers. For instance, content can include various combinations of text, video, ads, audio, multi-media streams, animations, images, and the like. Some examples of services include, but are not limited to, online computing services (e.g., "cloud" computing), web-based applications, a file storage and collaboration service, a search service, messaging services such as email and/or instant messaging for sending messages between different entities, and a social networking service to facilitate connections and interactions between groups of users who share common interests and activities.

In accordance with techniques described herein, the service provider 102 may implement a search service that includes or otherwise makes use of a search engine 116. Generally speaking, search queries 118 formed by a communication module 108 may be submitted to the service provider. The search queries may be obtained by the search engine 116 and processed to conduct a search that produces corresponding search results 120. The search results 120 may be provided as a response back to the client device 104, such as for output via a user interface 110 provided by a browser or other application.

In at least some instances, search queries 118 input by a user may include misspelled words/phrases and/or other errors as mentioned previously. To enable correction of such misspelled queries, the search engine 116 may include or otherwise make use of a correction module 122. The correction module 122 represents functionality to implement various SMT based search query spelling correction techniques described above and below. Although, shown as a component of the search engine 116, the correction module 122 may be provided as a standalone module. In addition or alternatively, the correction module 122 may be provided by a service provider 102 as shown, by a client device 104 (e.g., as a browser component, add-in, script-based module, or stand-alone application) and/or in a distributed manner in which functionality described in relation to the correction module 122 may be divided among multiple entities.

In particular, the search engine and/or correction module 122 may operate to facilitate logging of search query data 124 based on search queries. The search query data 124 may log the search strings and/or individual terms used in search queries 118. The search query data 124 may also include click-through data for search results 120 that indicates which links and/or suggestions for query corrections are selected by users. Thus, search query data 124 may include or otherwise be used to derive query correction pairs that match misspelled queries, terms, and substrings to corrected versions selected by users and/or employed to generate search results 120. The query correction pairs available from logged search query data 124 reflect error patterns that indicate how spelling may be translated between misspellings and corresponding corrections.

The correction module 122 may also implement query correction model(s) 126 that are based at least in part upon the error patterns. The query correction model(s) 126 may be derived using the logged search query data 124 and may be applied to generate corrected queries based on an input query. For instance, the query correction model(s) 126 may be employed by the correction module 122. In some cases, the models may be generated using model training tools that operate upon search query data 124 to analyze spelling error patterns. The query correction models 126 may be provided by way of a service of the service provider 102 (or a third party) that hosts the models and enables runtime access to the models, such as for use by the correction module 122 to correct input queries. In general, the query correction model(s) 126 encode probabilities for translation of a misspelled substring to a corrected substring and/or probabilities for appearance of words and characters together in sequence. These probabilities as well as other features may be combined in a suitable manner to score possible correction candidates one to another. In one embodiment, the query correction models 126 include at least a translation model, a word-based language model, and a character-based language model that may each contribute to a score used to rank different correction candidates. Accordingly, SMT based search query spelling correction techniques using various models may be employed to generate spelling corrections for input search queries in lieu dictionary based techniques and/or to supplement dictionary based techniques in some scenarios.

Figure 2:
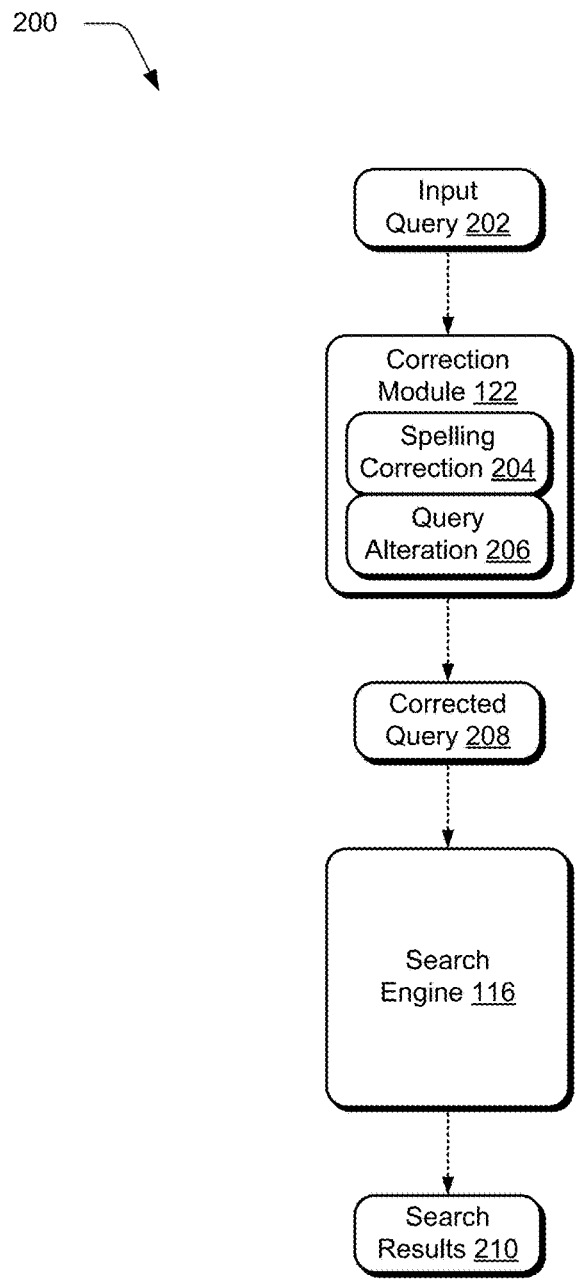
FIG. 2 is an illustration of an example search query spelling correction scenario in accordance with one or more embodiments.

To further illustrate, consider FIG. 2 which illustrates an example correction scenario in accordance with one or more embodiments, generally at 200. A client device 104 may provide an input query 202 to a search engine 116. The input query 202 may be processed by a correction module 122 to form one or more possible corrections for the query. The input query 202 may be parsed into individual phrases, terms, and/or substrings that may be examined to find misspellings and generate corresponding correction. In general, the correction module 122 may be configured to apply spelling correction 204 to correct the spelling of search terms in the input query 202. Spelling correction 204 may produce a spelling corrected version of the input query 202. The correction module 122 may also be configured to perform query alteration 206 to determine and/or suggests alternative terms, query arrangements, term expansion, and so forth to rewrite the query in an appropriate form. Query alteration 206 may be applied to a spelling corrected version of the input query 202 to produce a corrected query 208 that may be used as a suggestion and/or as input to the search engine 116 to cause a search.

Spelling correction and/or query correction may be based at least in part upon query correction model(s) 126 that implement SMT based search query spelling correction techniques described herein. In addition, in some scenarios, the correction module 122 may be configured to combine the SMT based search query spelling correction techniques with dictionary based techniques. For instance, some possible corrections may be determined at least in part by reference to a dictionary in addition to using error patterns. SMT techniques may then be applied to perform translations and/or rank candidates as discussed above and below to obtain a corrected query 208.

A corrected query 208 may be provided as a suggestion for selection by a user, such as via a browser interface or other suitable user interface 110. In another approach, the correction module 122 may be configured to automatically select and provide the corrected query 208 as input to a search engine 116. In either case, the corrected query 208 when selected may be feed into to the search engine 116 to cause a corresponding search. The search engine 116 generates search results 210 that may be provided back to the client device 104 for display to the user. Further discussion of SMT based search query spelling correction techniques may be found in relation to the following procedures.

Example Procedures

The following discussion describes SMT based search query spelling correction techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the example scenario 200 of FIG. 2.

Figure 3:
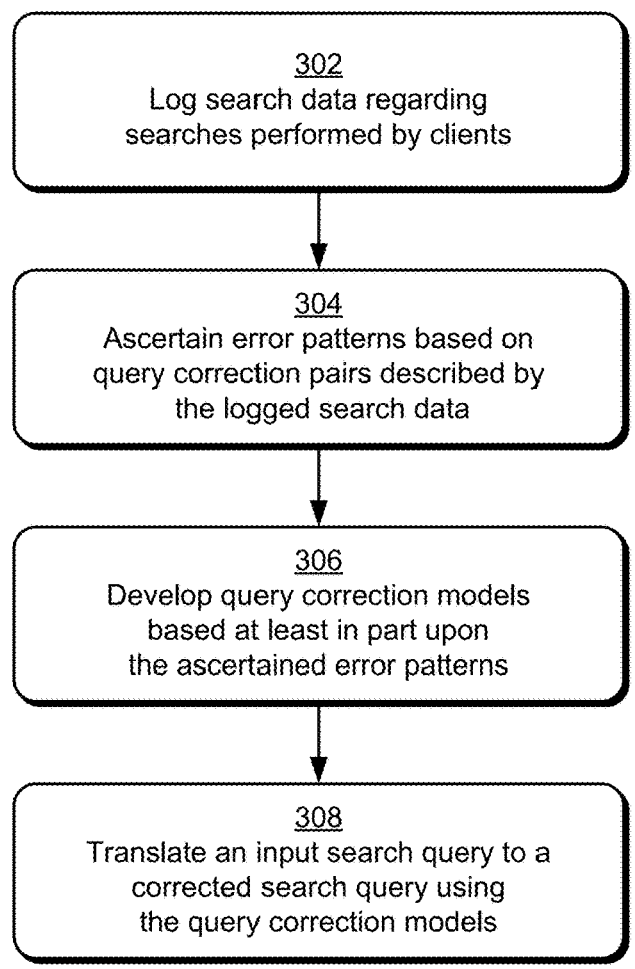
FIG. 3 is a flow diagram depicting a procedure in an example implementation in which error patterns in logged search data are used to generate models for search query correction.

FIG. 3 depicts a procedure 300 in an example implementation in which correction models for SMT based search query spelling correction techniques are developed. Search data regarding searches performed by clients is logged (block 302). For example, a service provider 102 may collect and store various search query data 124 obtained when searches are conducted by various client devices. In at least some embodiments, a logging server may be configured to monitor searches conducted via a search engine and store corresponding data. The logged data may include data regarding search queries 118 and corresponding search results, statistics regarding queries and search terms, and correlations between input queries, correction of the input queries, and/or interactions of users with results provided in response to queries (e.g., click-through data).

Error patterns are ascertained based on query correction pairs described by the logged search data (block 304). For example, a correction module 122 may be configured to access, analyze, and/or otherwise make use of logged search query data to ascertain error patterns described by the data. The error patterns indicate how substrings of input terms may be transformed or translated to corrected terms. The error patterns may be derived in any suitable way. In one approach, characters of a misspelled query may be aligned with a corrected version to produce a set of corresponding error patterns. By way of example, consider a search query described by the log data that is input as "britinay spares" and is corrected to "britney spears." In this example, character alignment may be employed to derive error patterns. The character alignment may occur by matching characters of the input query and the corrected version one to another. Here the matching may occur left to right and characters may be aligned as in Table 1 that follows, where characters appearing in the same column are aligned one to another:

TABLE 1

Example Character Alignment

| b | r | i | t | i | n | a | y | s | p | a | r | e | s |
|---|---|---|---|---|---|---|---|---|---|---|---|---|---|
| b | r | i | t |   | n | e | y | s | p | e | a | r | s |

From the above alignment, various error patterns for translation of substrings of the query may be ascertained. Some examples include (nay, ney), (ares, ears), and (spares, spears). It should be noted that the error patterns such as the examples above and data indicative of how frequently error patterns occur across different queries may both be maintained by the system as part of search query data 124 or otherwise.

Query correction models are developed based at least in part upon the ascertained error patterns (block 306). Then, an input search query is translated to a corrected search query using the query correction models (block 308). As mentioned, various query correction models that can be employed to inform query corrections may be developed using error patterns. The error patterns and corresponding models reflect actual inputs and corrections for queries that may be more reliable sources for corrections than pre-defined dictionaries traditionally employed. In at least some cases, the error patterns and corresponding models may be employed in lieu of using unreliable dictionary based techniques.

Generally speaking, the query correction models encode probabilities related to the error patterns and/or language construction of terms used in corrections reflected by the error patterns. In this approach, the correction is viewed as a translation problem in which a misspelled query is translated to a corrected version of the query. In particular, multiple query correction models may be used as components or "features" of a suitable algorithm configured to score and/or rank possible correction candidates for a given input query. Various different algorithms are contemplated. Details regarding some example query correction models and suitable algorithms are described in relation to the following figures.

Figure 4:
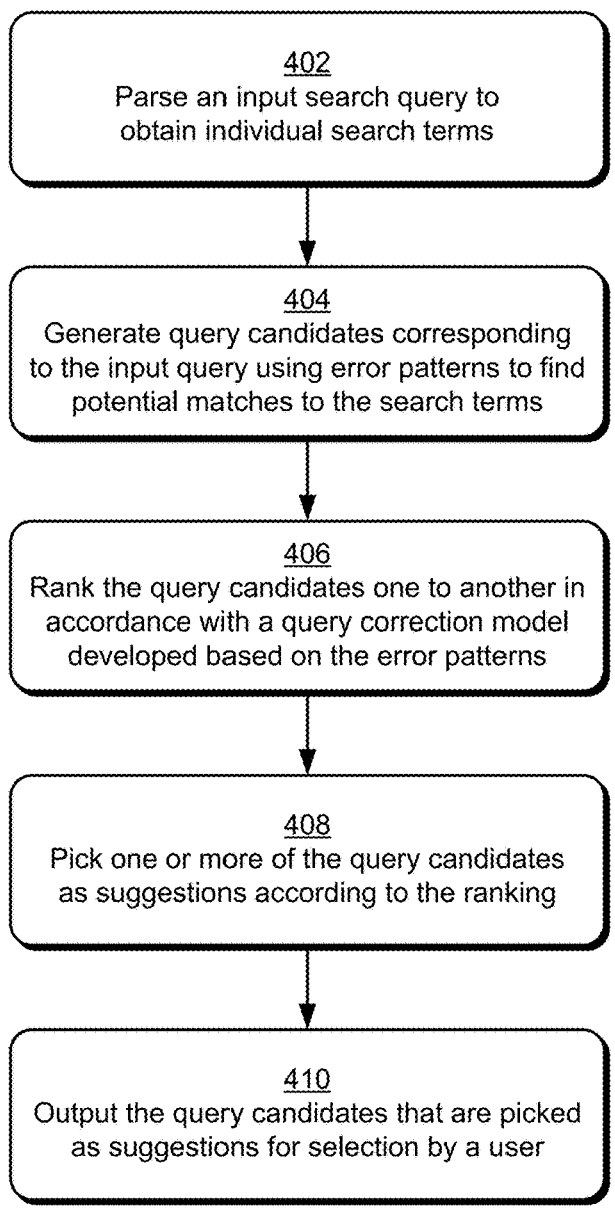
FIG. 4 is a flow diagram depicting a procedure in an example implementation in which an input search query is corrected.

FIG. 4 depicts a procedure 400 in an example implementation in which an input query is translated using SMT based search query spelling correction techniques. In at least some embodiments, a left-to-right beam search decoder may be implemented by the correction module 122 to process an input search query to find one or more possible corrections for the input query. This may occur using a log-linear algorithm or other suitable algorithm. In general, a suitable algorithm for the decoder may be designed to score and/or rank possible corrections in a manner that accounts for a set of different features at least some of which are derived from one or more query correction models. The features may also include character and or word properties associated with possible corrections. Additional discussion of example features may be found in relation to FIG. 5 below.

An input search query is parsed to obtain individual search terms (block 402). For example, the correction module 122 may process the input search query to parse or "tokenize" the input string into appropriate substrings for different words or search terms. Then, individual search terms and phrases may be further processed to find misspellings and/or corresponding correction candidates.

In particular, query candidates corresponding to the input query are generated using error patterns to find potential matches to the search terms (block 404). This may occur in any suitable way. In one approach, the correction module 122 may examine search query data 124 to look-up terms and match the terms to error patterns defined by the search query data 124. There may be multiple possible corrections for each term and/or substring. Thus, for each term/substring, a tree of possible corrections may be enumerated by matching portions of the input query with the error patterns. The correction module 122 may be configured to rely upon the error patterns to perform the matching in lieu of using a dictionary. In another approach, possible corrections enumerated for an input query by the correction module 122 may include both candidates based on error pattern matching and candidates derived using a dictionary.

The query candidates are ranked one to another in accordance with a query correction model developed based on the error patterns (block 406) and one or more of the query candidates are picked as suggestions according to the ranking (block 408). Given the tree of possible corrections enumerated per block 404, the correction module 122 may operate to perform a ranking operation to search for one or more top candidates using a suitable algorithm. Thus, the task of the ranking operation is to seek for an input (misspelled) query Q, one or more spelling candidates (C*) from among the possible spelling candidates by scoring and ranking the candidates one to another. The highest ranking candidates may be considered the "best" corrections for a given input query. The ranking operation may be generally expressed as follows:

$$C^* = \underset{C}{\operatorname{argmax}} P(C \mid Q)$$

Here, argmax is the search operation and $P(C|Q)$ is the ranking algorithm used to compute scores for different candidates. C* represents the top candidate having a score that optimizes (e.g., maximizes in this example) the ranking algorithm. Naturally, a list of multiple top candidates having the highest scores may also be returned.

As mentioned previously, the correction module 122 may include or otherwise make use of a left to-right beam search decoder to process an input query and perform the ranking operation. Given an input query, the decoder may first scan the input query character by character from left to right, and generate a list of candidate spellings for each possible substring according to the error patterns (substring to substring translation pairs) as described previously. The generated spelling candidates form a lattice or tree, which is a compact representation of many possible corrections. Using a suitable ranking algorithm, the decoder may search among the tree to find the top query candidates. Further details regarding the decoder and example ranking algorithms are provided in the following section titled "Query Correction Model Details."

The query candidates that are picked as suggestions are output for selection by the user (block 410). Here, one or more top candidates determined through the ranking operation in block 408 may be provided as suggestions to the user. This may occur in any suitable way. For instance, suggestions may be provided before a search is conducted. In this case, one or more suggested corrections may be exposed to the user. For example, a pop-up message, text box, toast message, or other suitable user interface instrumentality may be employed to display one or more query candidates when a user interacts with search functionality to submit an input query. The user may then be able to select from among the input query and the suggested query candidates.

In another approach, a search may be conducted using the original input query as well as one or more corrected versions of the query. In this case, suggestions and/or corresponding results may be presented in connection with search results 120 that are provided in response to the input search query. A search may also be conducted using both the misspelled input query and the corrected query. Accordingly, search results provided back to the user may incorporate items from various different versions of the input query. An option may also be provided to filter results to show results for either or both of the original input query and the suggested/corrected search query.

Having considered some example SMT based search query spelling correction techniques, the following section describes example details regarding query correction models that may be employed in one or more embodiments.

Query Correction Model Details

This section discusses example implementation details regarding query correction models. Various query correction models are contemplated that may be used in connection with the previously described systems, devices, and/or procedures for SMT based search query corrections. Generally speaking, the query correction models are designed to encode probabilities for translations of a misspelled substring to a corrected substring and/or probabilities for appearance of words and characters together in sequence. These probabilities as well as other features may be combined in a suitable manner to score possible correction candidates one to another.

As mentioned above, selection of query correction candidates may involve optimizing a ranking algorithm P(C|Q). Here the ranking algorithm may be defined to combine one or more individual query correction models in a manner that makes a probabilistic determination regarding the likelihood that a correction C is the highest ranking or "best" choice for an input query Q among possible spellings. A variety of suitable ranking algorithms configured to combine features from different query correction models are contemplated. In general, a ranking algorithm may be designed to include multiple features as different factors that may be weighted and combined to compute an overall score. In at least some embodiments, the query correction models include at least a translation model, a word-based language model, and a character-based language model that may each contribute features to a score used to rank different correction candidates. Different models are discussed just below after which a particular example application of query correction models is discussed in relation to FIG. 5.

Translation Model

The translation model captures spelling error patterns and corresponding translation probabilities. The model may be determined by analyzing historical query-correction pairs mined from logged search query data 124 that reflect actual input queries and corrections. This may involve character alignment of misspelled queries with corrected version as mentioned previously. From character aligned pairs, a set of error patterns can be derived. The error patterns may be configured as pairs of substrings indicating how spelling may be translated from one substring to another substring.

To optimize the analysis and/or keep computations/processing time manageable, a designated string-length may be set to control the size of error patterns used for the translation model. For example, the designated string-length may be set to nine in which case patterns having a substring length of no less than nine characters are extracted. Other string-lengths may also be designated.

The translation model is also configured to encode translation probabilities for the extracted error patterns. In other words, the translation model may be employed to determine how frequently particular error patterns occur. For instance, maximum likelihood estimation (MLE) may be applied to derive translation probabilities for each pair. MLE is a traditional statistical technique used to estimate model values for a data set that maximize the probability for observed data.

For query corrections as discussed herein, let (q,c) denote an error correction pair, where q is the input query or substring and c is the corrected version. The translation probabilities derived using MLE include P(q|c) and P(c|q).

In particular, P(q|c) is computed as P(q|c)=F(c,q)/F(c), where F(c,q) is the number of times that c and q are aligned per the error patterns, and F(c) is the number of occurrences of c in logged search query data 124 used to train the model. P(c|q) can be computed in a comparable manner. These and other probabilities may be pre-calculated and stored as part of the search query data 124. In addition or alternatively, probability computations for the translation model may be performed "on-demand" to analyze a particular input query and/or corresponding search terms responsive to receiving the input query.

Language Models

In addition to the translation model, one or more language models may also be employed to contribute features as factors in a ranking algorithm. Language models capture probabilities related to the way in which words, phrases, characters are typically combined in a correct manner. In other words, the language models capture knowledge of spelling and word usage. As with the translation model, language models may be derived using the logged search query data 124. Since language models are concerned with correct usage, the models may rely upon correct queries that are described by the search query data 124.

In one approach, n-gram language models are derived by analyzing queries having correct spelling. An n-gram model is configured to model the generative probability of a correction using Markov assumptions and/or the Markov chain rule. The value of n for a particular model may be set to specify that n number of characters, words, phrases, syllables, or other substring components of an input string are used for the particular model. In other words, the value of n designates the order of the model.

For example, the language models may include an n-gram word-based language model that operates to determine and/or encode the generative probability that n words occur in a word sequence. The n-gram word-based language model views a correction as a sequence of words, $C=w_1 w_2 \ldots w_N$. For instance, given n−1 immediate preceding words the probability for a next word to complete the sequence can be determined using the n-gram word-based language model. Although various values for n may be set, in one particular approach a trigram model for which n is set to three is employed. In this example, the word trigram model computes the generative probability as $P(C)=P(w_1)P(w_2|w_1)P(w_3|w_1,w_2) \ldots P(w_N|w_{N-2},w_{N-1})$. In other words, each word of a sequence is generated depending on two immediate preceding words, if they are available.

In addition, the language models may include an n-gram character-based language model that operates to determine and/or encode the generative probability that n characters occur in a character sequence. The n-gram character-based language model views a correction as a sequence of characters, $C=c_1 c_2 \ldots c_N$. For instance, given n−1 characters, the probability for a next character to complete the sequence/sub-string can be determined using the n-gram character-based language model. Although various values for n may be set, in one particular approach a 9-gram character-based language model for which n is set to nine is employed. In accordance with the 9-gram character-based language model, a correction may be generated from left to right at the character level by assuming that each character is generated depending on eight immediate proceeding characters.

Example Ranking Algorithm and Decoder

A mentioned, multiple different features including features derived from the foregoing example query correction models may be used as factors in a ranking algorithm. A left to right beam search decoder or other suitable decoder may be implemented to apply the algorithm and generate suggestions for an input query. In at least some embodiments, the ranking algorithm P(C|Q) is a log linear model having the following form:

$$P(C|Q) = \frac{1}{Z(Q,C)} \exp \sum_i \lambda_i h_i(Q,C)$$

In the above expression, $$\frac{1}{Z(Q,C)}$$

is a normalization factor to ensure that the probability computed sums to one. The term $h_i$ is referred to as a feature function and represents the different respective features uses as factors in the expression. A variety of different features may be used example of which are discussed just below. $\lambda_i$ is a weight factor that may be set individually for the different features. The weight factor $\lambda_i$ is a configurable parameter that may be employed to tune the algorithm by changing the relative contributions of different features to the overall ranking score.

In the preceding example, notice that P(C|Q) is modeled as a weighted linear combination of a set of selected features in the logarithmic form, and the value is normalized. At least some feature functions $h_i$ are derived from the translation model and language models described earlier. For example, h(C,Q) may be defined as a logarithm of a translation model probability, and h(C) may be defined as a logarithm of a character (or word) language model probability. The feature functions $h_i$ may also include features based on properties of words, characters, and substrings associated with possible corrections. Some example feature functions are listed in Table 2 just below:

TABLE 2

Example Feature Functions

| Feature | Description |
|---|---|
| Translation Model Features (features derived from the translation model) | |
| 1. log P$_{raw}$(c|q) = log (f(c, q) / f(q)) | probability of a correction phrase (e.g., "ritney s") given a query phrase (e.g., "ritnays") |
| 2. log P$_{raw}$(q|c) | comparable to item 1 for (q|c) |
| 3. log P$_{smoothed}$(c|q) | similar to item 1 but smoothed ... In other words, P(ritney s|ritnays) is not set to one even if that's the only pair in the training data. |
| 4. log P$_{smoothed}$(q|c) | comparable to item 3 for (q|c) |
| Language Model Features (features derived from the language models) | |
| 5. log P$_{char}$(c) | character language model probability |
| 6. log P$_{word}$(c) | word language model probability (applicable at word boundaries) |
| Other Features (features derived from correction properties) | |
| 7. |c| | length in characters |
| 8. ||c|| | length in words (applicable at word boundaries) |
| 9. |q -> c| | number of char-level translations used. For example, the number is 3 in this translation "(brit)(nays p)(ares) -> (brit)(ney sp)(ears)", where the ( ) demarcate translation phrase boundaries |

TABLE 2-continued

Example Feature Functions

| Feature | Description |
|---|---|
| 10. ||q -> c|| | number of word-level translations used (applicable at word boundaries) |

Thus, a variety of feature functions, such as the examples provide above in Table 2, may be combined to score and/or rank query correction candidates one to another. In at least some cases, the features are combined using a weighted log linear model such as the example model $$P(C|Q) = \frac{1}{Z(Q,C)} \exp \sum_i \lambda_i h_i(Q,C)$$

discussed above.

Figure 5:
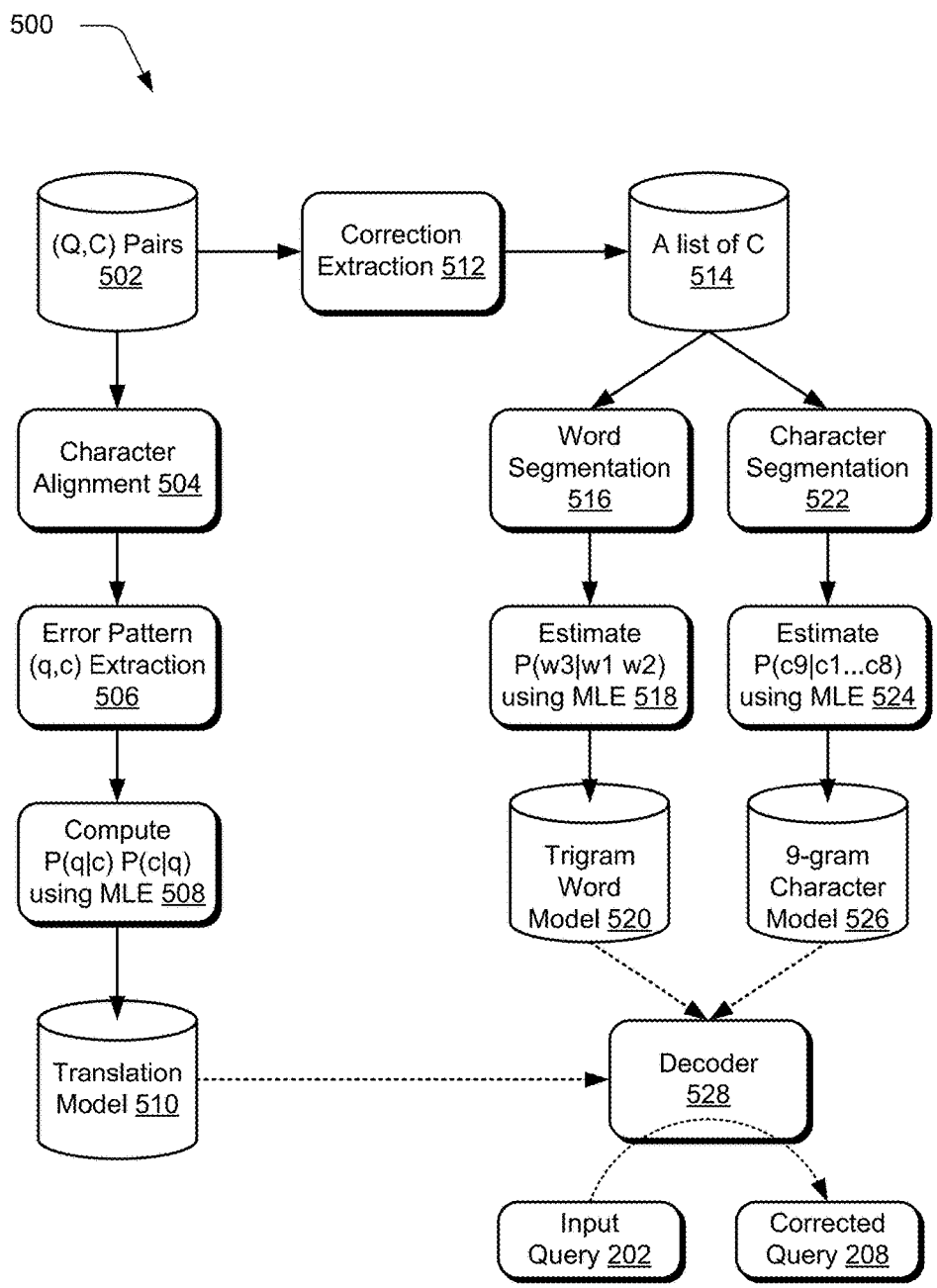
FIG. 5 is a flow diagram depicting an example scenario in which multiple query correction models are employed to provide features to a decoder for search query corrections.

In this context, consider now the example scenario 500 of FIG. 5 in which multiple query correction models and features are employed to implement query corrections. For example, a correction module 122 may be configured to apply ranking algorithms to analyze input search queries 118 and generate corresponding spelling correction suggestions and/or search results 120. The correction module 122 may make use of various query correction models 126 including translation models and language models as discussed previously.

In particular, FIG. 5 depicts a database of search data 502 that may be logged as previously discussed. The search data 502 may include query correction pairs of the form (Q,C) that match input queries with corresponding corrections. The correction module 122 may perform character alignment 504 on the query correction pairs. Based on the character alignment 504, the correction module 122 may perform error pattern extraction 506 to derive error patterns (q,c) that match substrings of the query q with spelling corrections c for the substrings. Now, at 508 probabilities for the error patterns may be computed. The probabilities computed may include P(q|c) and P(c|q). The probabilities and corresponding error patterns may be encoded as a translation model 510 as represented in FIG. 5.

In addition, the search data 502 may be employed to derive language models. To do so, correction extraction 512 may be performed to generate a list of correction 514. The list of corrections 514 represent correctly spelled queries/strings/substrings that are described by the collected search data 502.

The correction module 122 may perform word segmentation 516 on the list of correction 514 to generate individual words. Then, a trigram word model analysis (or other n-gram model) may be performed on the generated words to estimate word probabilities using MLE. In the trigram word model, the correction module 122 may estimate the probability P(w3|w1w2) using MLE at 518. This analysis produces a trigram word model 520 that encodes the word probabilities as represented in FIG. 5.

The correction module may also perform character segmentation 522 on the list of corrections 514 to generate individual characters. Then, a 9-gram character model analysis (or other n-gram model) may be performed on the generated characters to estimate character probabilities using MLE. In the 9-gram character model, the correction module 122 may estimate the probability P(c3|c1 ... c8)

using MLE at 524. This analysis produces a 9-gram character model 526 that encodes the character probabilities as represented in FIG. 5.

Now, a decoder 528 implemented by the correction module 122 or otherwise may be configured to take an input query 202 and form a corrected query 208 using the techniques described herein. For example, the decoder 528 may be configured to apply a ranking algorithm that combines a selected set of features as described previously. As shown in FIG. 5, the decoder 528 may be configured to use information supplied by any or all of the translation model 510, trigram word model 520 and/or 9-gram character model 526. For instance, the decoder 528 may operate to compute ranking scores as a weighted log linear combination of features from the example query correction models as well as other suitable features.

In practice, analyzing large amounts of search data and/or possible correction candidates may be computationally expensive. To decrease the computational burden, the decoder 528 may implement some optimizations and/or simplifications in some embodiments. The optimizations and/or simplifications may be employed to decrease latency and/or increase efficiency of the decoder 528.

Given that the search space of possible correction may be quite large, the optimizations for the decoder 528 aim to reduce the number of computations and/or cost of computing the feature functions $h_i(Q,C)$ across search candidates. For character decoding, the decoder uses a high-order (e.g., 9-gram) model with a small vocabulary (e.g., the alphabet). In this case, it is costly to keep the language model score which may be expressed as:

$$h_{LM}(Q,C) = \log P_{LM}(C = c_1 c_2 \ldots c_N) \approx \log P(c_1) P(c_2|c_1) P(c_3|c_1 c_2) \ldots c_8) P(c_{10}|c_2 c_3 \ldots c_9) \ldots P(c_N|c_{N-8} \ldots c_{N-1})$$

For a high-order model, "backoff" to a lower order model may be performed when the full 9-gram (e.g., $c_1 c_2 \ldots c_9$) is not in the model:

$$P(c_9|c_1 c_2 \ldots c_8) = \alpha(c_1 c_2 \ldots c_8) P(c_9|c_2 \ldots c_8)$$

When the 8-gram (e.g., $c_2 \ldots c_9$) is still not in the model, more backup may occur. Similarly, it may be the case that for a context such as a 7-gram (e.g., $c_3 \ldots c_9$), the 7-gram can either not expand to an 8-gram with any character, or a few characters, such as one or more rarely two characters, can expand the 7-gram to an 8-gram. The decoder 528 may be configured to take advantage of such deep backoffs and the sparse nature of high-order grams in several ways.

First, the decoder 528 may employ a finite state machine representation that aggressively expands backoffs offline. Effectively, backoffs for the lower-order (denser) grams are expanded. Each lower-order gram may have |V| succeeding characters (where |V| is the alphabet size) in the finite state machine. The decoder 528 may be specialized to handle such dense grams. For higher-order grams (which are generally sparse), the decoder 528 may be specialized to handle cases where there is no, 1, or 2 succeeding characters. In effect a bifurcated approach is used to handle the dense and sparse cases. By having bifurcated dense implementations at lower order and sparse implementations at higher order, the use of more generic and less efficient techniques designed to handle from 3 to |V|−1 chars can be reduced or eliminated.

Another technique for optimization of the decoder 528 is referred to as "recombination plus." Recombination is a technique to prune the search tree when a subtree shares the same structure as another subtree except that there is a constant cost shift. The subtree with higher cost can be "recombined" with the subtree having a lower cost. The structure of the subtree is identified by the "context" of the root node of the subtree. With a left-to-right decoder, the context is usually the last N−1 characters, where N is the order of the language model used for decoding. Thus recombination happens when the last N−1 characters of the two subtrees (e.g., hypotheses) are the same. For a high-order language model with deep backoffs, the effective context is usually less than N−1. A finite state machine representation makes it fairly straightforward and efficient to discover subtrees having the same effective context under deep backoffs. Thus, the decoder 528 may be configured to take advantage of these characteristics, and recombine more aggressively.

Another decoder optimization technique is called "early pruning plus." When a search tree for a given scenario is constructed, a new hypothesis (e.g., child node) is derived from a previous hypothesis (e.g., parent node) by taking a phrase to phrase translation. A cost or cost estimate for the new hypothesis is computed, and the hypothesis may be pruned if it is outside the given beam. Early pruning may operate to prune the hypothesis even before calculating the more costly components of the cost (e.g., language model score). To extend this idea, the decoder may be configured to consider finer subcomponents of a ranking algorithm score. Due once again to the high-order nature of our translation model, it may be the case that a new hypothesis grows by 3 or more characters. Recall that a Markov chain rule may be applied to update the language model score. Early pruning decisions may be made after each step of the chain rule, or even after each backoff step. For example, say the new hypothesis score is given as follows:

$$\text{score}(H') = \text{score}(H) + \sum_{i=1}^{3} \lambda_i h_i(H' \mid H)$$

Early pruning refers to pruning of H' after adding feature updates $h_1$ and $h_2$, without proceeding to calculate $h_3$. Early pruning plus will prune H' even inside the computation of $h_2$ if the computation has many steps (as is true in the case of language model feature updates):

$$h_2(H'|H) = \log \alpha_1 p_1 \alpha_2 \alpha_2' p_2 \ldots \alpha_n \alpha_n' \alpha_n'' p_n$$

If $h_3$ and/or other pruned features, even computing all of h2 itself, are computationally expensive, considerable time and resources may be conserved by early pruning plus. The foregoing example decoder optimizations and other optimizations may be selectively applied alone or in combinations to reduce computational cost and/or increase the efficiency of the decoder 528.

Having considered some query correction model details, consider now a discussion of example systems and devices that may implement SMT based search query spelling correction techniques in one or more embodiments.

Example System and Device

Figure 6:
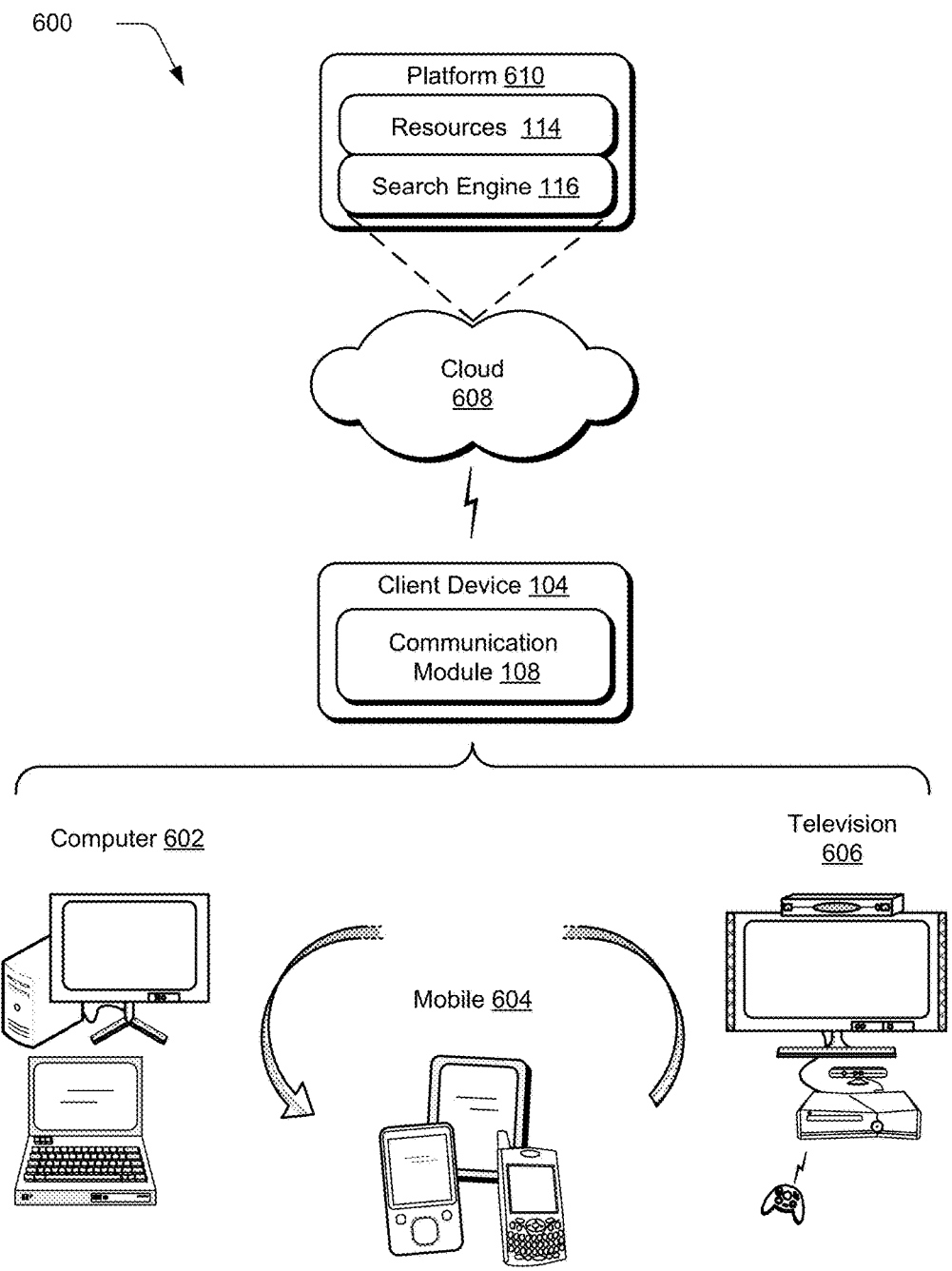
FIG. 6 illustrates an example system that includes the client device as described with reference to FIG. 1.

FIG. 6 illustrates an example system 600 that includes the client device 104 as described with reference to FIG. 1. The example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the client device 104 may assume a variety of different configurations, such as for computer 602, mobile 604, and television 606 uses. Each of these configurations includes devices that may have generally different constructs and capabilities, and thus the client device 104 may be configured according to one or more of the different device classes. For instance, the client device 104 may be implemented as the computer 602 class of a device that includes a personal computer, desktop computer, a multi-screen computer, laptop computer, netbook, and so on.

The client device 104 may also be implemented as the mobile 604 class of device that includes mobile devices, such as a mobile phone, portable music player, portable gaming device, a tablet computer, a multi-screen computer, and so on. The client device 104 may also be implemented as the television 606 class of device that includes devices having or connected to generally larger screens in casual viewing environments. These devices include televisions, set-top boxes, gaming consoles, and so on. The techniques described herein may be supported by these various configurations of the client device 104 and are not limited to the specific examples the techniques described herein. Further, this functionality may also be distributed "over the cloud" as described below. In any of the described configurations, the client device 104 may include a communication module 108, such as browser, to enable various communications and interaction to send message and/or access resources 114 available "in the cloud."

The cloud 608 includes and/or is representative of a platform 610 for resources 114. The platform 610 abstracts underlying functionality of hardware (e.g., servers) and software resources of the cloud 608. The resources 114 may include applications, services, content, and/or data that can be utilized while computer processing is executed on servers that are remote from the client device 104. Resources 114 can be provided as a service over the Internet and/or through a subscriber network, such as a cellular or Wi-Fi network. Resources 114 may include a search engine 116 configured to implement SMT based search query spelling correction techniques as described above and below.

The platform 610 may abstract resources and functions to connect the client device 104 with other computing devices. The platform 610 may also serve to abstract scaling of resources 114 to provide a corresponding level of scale to encountered demand for the resources that are implemented via the platform 610. Accordingly, in an interconnected device embodiment, implementation of functionality of the functionality described herein may be distributed throughout the system 600. For example, the functionality may be implemented in part on the client device 104 as well as via the platform 610 that abstracts the functionality of the cloud 608.

Figure 7:
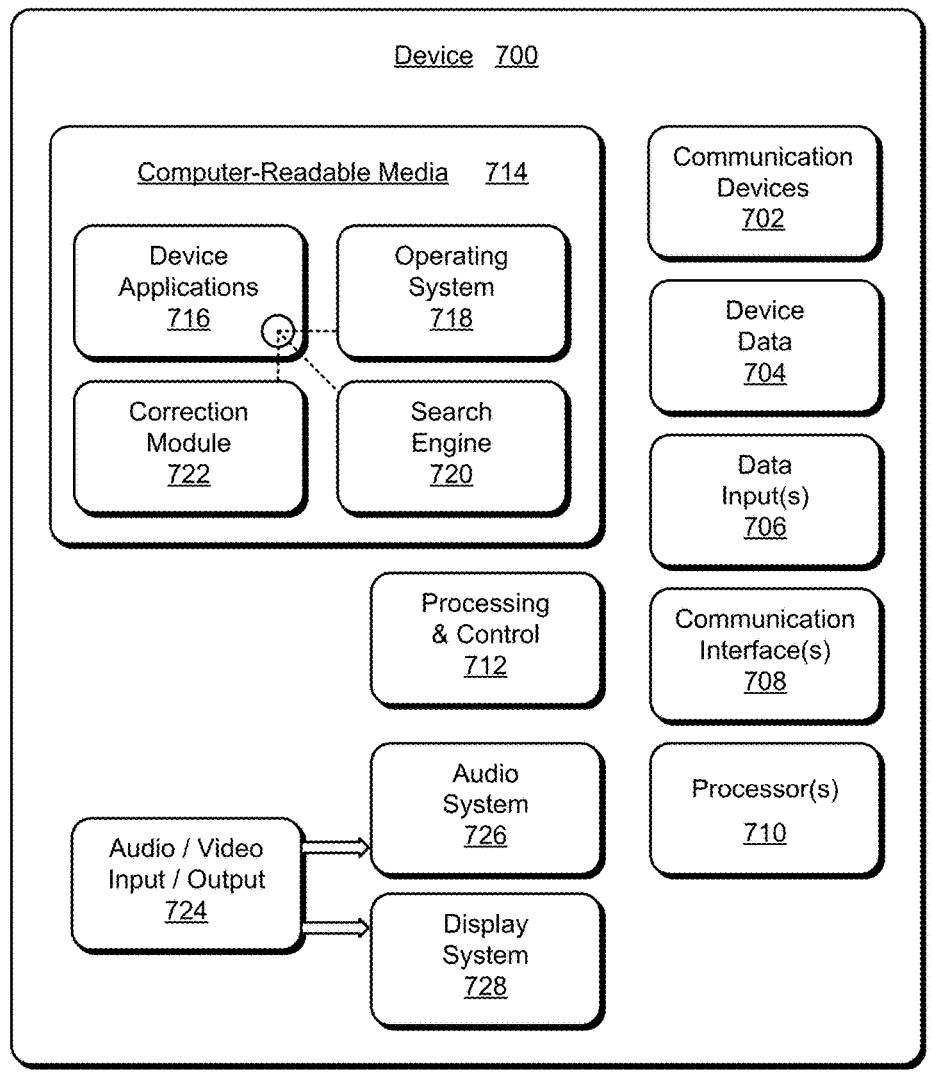
FIG. 7 illustrates various components of an example device to implement embodiments of the techniques described herein.

FIG. 7 illustrates various components of an example device 700 that can be implemented as any type of computing device as described with reference to the previous figures to implement embodiments of SMT based search query spelling correction techniques described herein. In embodiments, the device may be implemented as any one or combination of a fixed or mobile device, in any form of a consumer, computer, portable, user, communication, phone, navigation, television, appliance, gaming, media playback, and/or electronic device. The device may also be associated with a user (i.e., a person) and/or an entity that operates the device such that a device describes logical devices that include users, software, firmware, hardware, and/or a combination of devices.

The device 700 includes communication devices 702 that enable wired and/or wireless communication of device data 704 (e.g., received data, data that is being received, data scheduled for broadcast, data packets of the data, etc.). The device data 704 or other device content can include configuration settings of the device, media content stored on the device, and/or information associated with a user of the device. Media content stored on device 700 can include any type of audio, video, and/or image data. Device 700 includes one or more data inputs 706 via which any type of data, media content, and/or inputs can be received, such as user-selectable inputs, messages, music, television media content, recorded video content, and any other type of audio, video, and/or image data received from any content and/or data source.

Device 700 also includes communication interfaces 708 that can be implemented as any one or more of a serial and/or parallel interface, a wireless interface, any type of network interface, a modem, and as any other type of communication interface. The communication interfaces 708 provide a connection and/or communication links between device 700 and a communication network by which other electronic, computing, and communication devices communicate data with device 700.

Device 700 includes one or more processors 710 (e.g., any of microprocessors, controllers, and the like) which process various computer-executable or readable instructions to control the operation of device 700 and to implement the gesture embodiments described above. Alternatively or in addition, device 700 can be implemented with any one or combination of hardware, firmware, or fixed logic circuitry that is implemented in connection with processing and control circuits which are generally identified at 712. Although not shown, device 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 700 also includes computer-readable media 714 that may be configured to maintain instructions that cause the device, and more particularly hardware of the device to perform operations. Thus, the instructions function to configure the hardware to perform the operations and in this way result in transformation of the hardware to perform functions. The instructions may be provided by the computer-readable media to a computing device through a variety of different configurations.

One such configuration of a computer-readable media is signal bearing media and thus is configured to transmit the instructions (e.g., as a carrier wave) to the hardware of the computing device, such as via a network. The computer-readable media may also be configured as computer-readable storage media that is not a signal bearing medium and therefore does not include signals per se. Computer-readable storage media for the device 700 can include one or more memory devices/components, examples of which include fixed logic hardware devices, random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 700 can also include a mass storage media device.

Computer-readable media 714 provides data storage mechanisms to store the device data 704, as well as various device applications 716 and any other types of information and/or data related to operational aspects of device 700. For example, an operating system 718 can be maintained as a computer application with the computer-readable media 714 and executed on processors 710. The device applications 716 can include a device manager (e.g., a control application, software application, signal processing and control module, code that is native to a particular device, a hardware abstraction layer for a particular device, etc.). The device applications 716 also include any system components or modules to implement embodiments of the techniques described herein. In this example, the device applications 716 include a search engine 720 and a correction module 722 that are shown as software modules and/or computer applications. The correction module 722 is representative of software that is used to provide SMT based search query correction in connection with searches conducted via the search engine 720 as described above and below. Alternatively or in addition, search engine 720, correction module 722 and/or other device applications 716 of the device 700 may be implemented as hardware, fixed logic device, software, firmware, or any combination thereof. In a client configuration, the device applications 716 may include a communication module 108 and/or other client applications.

Device 700 also includes an audio and/or video input-output system 724 that provides audio data to an audio system 726 and/or provides video data to a display system 728. The audio system 726 and/or the display system 728 can include any devices that process, display, and/or otherwise render audio, video, and image data. Video signals and audio signals can be communicated from device 700 to an audio device and/or to a display device via an RF (radio frequency) link, S-video link, composite video link, component video link, DVI (digital video interface), analog audio connection, or other similar communication link. In an embodiment, the audio system 726 and/or the display system 728 are implemented as external components to device 700. Alternatively, the audio system 726 and/or the display system 728 are implemented as integrated components of example device 700.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by one or more computing devices, the method comprising:
   receiving, at the one or more computing devices via a communications network, a plurality of search queries performed by a plurality of client devices;
   logging search data regarding the plurality of search queries performed by the plurality of client devices by storing the search data in a data storage device accessible to the one or more computing devices;
   ascertaining, at the one or more computing devices, error patterns based on query correction pairs described by the logged search data for both words and substrings that are contained by a word;
   developing, at the one or more computing devices based at least in part upon the ascertained error patterns, multiple query correction models reflecting how frequently the ascertained error patterns occur in the logged search data, including:
      at least a first query correction model that encodes probabilities for translations of substrings that are contained by a word based on character alignment, each probability for translation determined based on a frequency of a particular input substring being changed to a particular correct substring, and
      at least a second query correction model that encodes probabilities for n-gram models for both words and characters based on preceding words and characters;
   receiving, at the one or more computing devices via the communications network, an input search query performed by a subject client device;
   translating, at the one or more computing devices, the input search query performed by the subject client device to a corrected search query by selecting a top ranking candidate from a group of candidates, each candidate ranked using a combination of probabilities from each of the multiple query correction models;
   providing the corrected search query to a search engine to generate a set of search results based, at least in part, on the corrected search query; and
   providing the set of search results to the subject client device via the communications network.

2. A method as described in claim 1, wherein the combination of probabilities includes multiple probabilities from one or more of the multiple query correction models.

3. A method as described in claim 1, wherein the combination of probabilities further includes a feature descriptive of translations used for a given candidate.

4. A method as described in claim 1, wherein the at least a second query correction model comprises a trigram word-based language model configured to encode probabilities for a next word in a sequence given two preceding words in the sequence.

5. A method as described in claim 1, wherein the at least a second query correction model includes a nine-gram character-based language model configured to encode probabilities for a next character in a sequence given eight preceding characters in the sequence.

6. A method as described in claim 1, wherein each candidate is ranked according to a weighted log-linear model that combines the probabilities from each of the multiple query correction models.

7. A method as described in claim 6, wherein the log-linear model has the form of:

$$P(C|Q) = \frac{1}{Z(Q,C)} \exp \sum_i \lambda_i h_i(Q,C) \text{ where } \frac{1}{Z(Q,C)}$$

is a normalization factor, $h_i(Q,C)$ represents the probabilities that are combined and $\lambda_i$ represents weight factors applied to the probabilities.

8. A method as described in claim 6, wherein the top ranking candidate is the candidate that maximizes the weighted log-linear model.

9. One or more computer-readable storage media storing instructions that, when executed via the one or more processors of one or more computing devices, implement a correction module to perform operations comprising:
receiving, at the one or more computing devices via a communications network, a plurality of search queries performed by a plurality of client devices;
logging search data regarding the plurality of search queries performed by the plurality of client devices by storing the search data in a data storage device accessible to the one or more computing devices;
ascertaining, at the one or more computing devices, error patterns based on query correction pairs described by the logged search data for both words and substrings that are contained by a word;
developing, at the one or more computing devices based at least in part upon the ascertained error patterns, multiple query correction models reflecting how frequently the ascertained error patterns occur in the logged search data, including:
at least a first query correction model that encodes probabilities for translations of substrings that are contained by a word based on character alignment, each probability for translation determined based on a frequency of a particular input substring being changed to a particular correct substring, and
at least a second query correction model that encodes probabilities for n-gram models for both words and characters based on preceding words and characters;
receiving, at the one or more computing devices via the communications network, an input search query performed by a subject client device;
parsing the input search query to obtain individual search terms and substrings contained in the individual search terms;
generating a group of candidates corresponding to the input search query using the ascertained error patterns;
ranking the group of candidates one to another in accordance with scores computed using the multiple query correction models developed based on the ascertained error patterns;
translating, at the one or more computing devices, the input search query performed by the subject client device to a corrected search query by selecting a top ranking candidate from the group of candidates, each candidate ranked using a combination of probabilities from each of the multiple query correction models;
providing the corrected search query to a search engine to generate a set of search results based, at least in part, on the corrected search query; and
providing the set of search results to the subject client device via the communications network.

10. One or more computer-readable storage media as described in claim 9, wherein the generating and ranking comprise using a left-to right beam search decoder configured to search for corrections for the input search query according to the multiple query correction models.

11. One or more computer-readable storage media as described in claim 9, wherein ranking the query candidates one to another comprises computing a score for each of the query candidates using a ranking algorithm that combines probabilities encoded by the multiple query correction models.

12. One or more computer-readable storage media as described in claim 11, wherein the ranking algorithm comprises a weighted log-linear model.

13. One or more computer-readable storage media as described in claim 11, wherein the score is computed using multiple features derived from a query correction model of the multiple query correction models.

14. One or more computer-readable storage media as described in claim 9, wherein generating the group of candidates comprises producing a list of the group of candidates by translating substrings of the search terms to form the spelling corrections of the search terms by matching the substrings to the error patterns.

15. One or more computer-readable storage media as described in claim 9, wherein the error patterns are applied to derive the group of candidates in lieu of using a predefined dictionary for at least some of the search terms.

16. A system of one or more computing devices comprising:
one or more processors;
one or more computer-readable storage media storing instructions that, when executed via the one or more processors, implement a correction module to perform operations to translate an input search query to a corrected search query including:
receiving, at the one or more computing devices via a communications network, a plurality of search queries performed by a plurality of client devices;
logging search data regarding the plurality of search queries performed by the plurality of client devices by storing the search data in a data storage device accessible to the one or more computing devices;
ascertaining, at the one or more computing devices, error patterns based on query correction pairs described by the logged search data for both words and substrings that are contained by a word;
developing, at the one or more computing devices based at least in part upon the ascertained error patterns, multiple query correction models reflecting how frequently the ascertained error patterns occur in the logged search data, including:
at least a first query correction model that encodes probabilities for translations of substrings that are contained by a word based on character alignment, each probability for translation determined based on a frequency of a particular input substring being changed to a particular correct substring, and
at least a second query correction model that encodes probabilities for n-gram models for both words and characters based on preceding words and characters;
receiving, at the one or more computing devices via the communications network, the input search query performed by a subject client device;

deriving a group of candidates for the corrected query based on the input search query;

for each candidate that is derived, computing a score for the candidate as a weighted combination of multiple features calculated using the multiple query correction models;

translating, at the one or more computing devices, the input search query performed by the subject client device to the corrected search query by selecting a top ranking candidate from the group of candidates, each candidate ranked using the score for that candidate;

providing the corrected search query to a search engine to generate a set of search results based, at least in part, on the corrected search query; and providing the set of search results to the subject client device via the communications network.

17. The system as described in claim 16, wherein:
the second query correction model is a nine-gram model for which the number of preceding characters is designated as eight.

18. The system as described in claim 16, wherein the multiple features combined to score the candidates further comprises one or more of character length, length in words, number of character-level translations, or number of word-level translations.

19. The system as described in claim 16, wherein the first and second query correction models are derived based upon the query correction pairs of the logged search data determined from user selections of suggested query corrections.

20. The system as described in claim 16, wherein the correction module is provided as a component of a web search engine.

* * * * *